3,081,280
STABILIZED POLYOXYMETHYLENE
Dana Peter Carlson, Wilmington, Del., assignor to E. I. du Pont de Nemours and Company, Wilmington, Del., a corporation of Delaware
No Drawing. Filed Aug. 31, 1960, Ser. No. 53,056
6 Claims. (Cl. 260—45.85)

This invention provides high molecular weight polyoxymethylenes stabilized against photodegradation, and, more particularly, it provides high molecular weight, polyoxymethylenes modified with certain cinnamonitriles as photostabilizers.

High molecular weight polyoxymethylenes, those having a number average molecular weight of at least 15,000, have sufficiently good physical properties, such as toughness, stiffness, and tensile strength, to be classed as plastics which may be molded, extruded, or spun into various useful articles. Polyoxymethylenes, like most plastics, are susceptible to photodegradation, which, in turn, causes the polymer to have undesirable physical properties.

It is an object of this invention to provide polyoxymethylene compositions stabilized against photodegradation by the presence of certain cinnamonitriles. Other objects will appear in the more detailed explanation of the invention which follows.

The above objects are accomplished by providing a high molecular weight polyoxymethylene having a number average molecular weight of at least 15,000, and containing from 0.01% to 10% by weight of a cinnamonitrile having the formula:

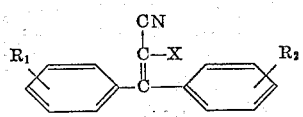

wherein $R_1$ and $R_2$ are groups selected from the class consisting of alkyl groups of 1–4 carbon atoms, alkoxy groups of 1–12 carbon atoms, cyclohexyl, hydrogen, and chlorine and X is a group selected from the class consisting of cyano, carboalkoxy groups of 1 to 4 carbon atoms, carboxamide, carboxamides substituted with at least one alkyl group of 1 to 4 carbon atoms and carboxamides substituted with a phenyl group.

The sensitivity of polyoxymethylene to acids or bases which initiates thermal degradation renders the above types of cinnamonitriles superior to known types of photostabilizers for polyoxymethylene since these additives are substantially neutral. In addition, most of these nitriles produce essentially no color change in the plastic. One of the best photostabilizers, and the preferred one, indicated by the above formula is alpha-carbethoxy beta-phenyl cinnamonitrile, since it causes no color change and no reduction in the thermal stability of the base resin.

In the following examples the polyoxymethylenes are characterized by various tests which measure their thermal stability and their photostability. The thermal stability of the polymeric compositions of this invention is reported herein as "Gas Index" (GI). The numerical value of GI is 3.7 times the milliliters of gas evolved per gram of polymer per 15 minutes elapsed times at 231° C. The GI of a polymeric sample is determined by heating a weighed sample of polymer in a hypodermic syringe at 231° C. and observing the position of the syringe plunger at 5 and 20 minutes after the beginning of the test. The syringe which is used in this test should be about 50 milliliters in volume having the bottom of the syringe cylinder flattened nad sealed with a capillary tube extending through the syringe plunger to provide a means for introducing inert gas at the base, or bottom, of the cylinder. The capillary tube which is inserted through the syringe plunger extends beyond the upper portion thereof and is covered with a suitable means to seal the end of the capillary tube. A sample holder, such as a flat, glass dish, is placed in the bottom of the syringe cylinder. All equipment used in the test is well cleaned. Polymer, in the form of molding powder or other melt composited material, is weighed to the nearest 0.0005 gram and placed in the sample holder which is inserted in the base of the syringe and the plunger is pushed into the syringe cylinder to expel all the air therefrom. The syringe is then evacuated and filled with nitrogen several times by introducing the nitrogen and withdrawing the same gas through the capillary tube in the plunger. During the last purging of the syringe a small amount of silicone oil is placed on the upper portion of the plunger to insure a tight seal thereof with the cylinder. The capillary tube is then sealed and the syringe is placed in a vapor bath at 231° C. The vapor bath may be vapors of n-decyl alcohol. The position of the syringe cylinder is noted with a cathetometer at 5 minutes and again at 20 minutes after the syringe is first placed in the vapor bath. The change in the position of the syringe piston over a 15 minute period determines the amount of gas evolved in the test and, thus, the amount of polymer which has degraded to monomer or other gas. The value for GI is 3.7 times the indicated number of milliliters of gas evolved per gram of polymer during the period of from 5 to 20 minutes after the beginning of the test. Unless otherwise reported herein the same procedure is used for each sample indicated.

The thermal degradation of polyoxymethylenes generally follows that predicted for the first-order reaction. From time to time there may be observed a slight variation from a first order reaction, but it has been found that for all practical purposes the kinetics of a first order reaction define this degradation reaction.

The thermal stability of polyoxymethylene has been reported in certain other instances as a reaction rate constant for thermal degradation at 222° C. ($k_{222}$) in units of percent by weight of the polymer which degrades per minute at 222° C. In U.S. Patent 2,768,994, issued to R. N. MacDonald on October 30, 1956, certain polyoxymethylenes are claimed which have a $k_{222}$ of less than 1% by weight per minute. This reaction rate constant for thermal degradation when multiplied by 5400 will roughly correspond to the GI value of the given sample. Thus, a value of $k_{222}$ of 0.01% is approximately equal to a GI of 54.

The number average molecular weight of the polyoxymethylene of the present invention may be measured by the classical methods of osmometry, by infrared techniques, or by inherent viscosity measurements. The methods other than osmometry require the establishment of conversion factors or graphical relationship to convert the measurements to molecular weight, but this is easily accomplished by those skilled in the art.

The effectiveness of the tested photostabilizers was determined by subjecting injection molded samples ⅛ inch in thickness, 1½ inches wide, and 2 inches long, to various times of exposure to light and visually observing the condition of the surface of the exposed sample with respect to hazing and/or cracking of the surface. The exposure was accomplished in a filtered X–W Weather-Ometer as described in ASTM E 42–55 T, the X–W Weather-Ometer corresponding to the type E machine in that specification.

The stabilizers set forth in the following examples can be prepared according to the general processes set forth by A. C. Cope et al., Journal of American Chemical Society, vol. 69, page 3452 (1941), commonly known as the Knoevenagel Reaction, and in the article by E. J. Cragoe et al., Journal of Organic Chemistry, vol. 15, page 381 (1951).

The following examples are intended to illustrate and not to restrict the present invention. Parts and percentages are based on weight unless otherwise noted.

EXAMPLE 1

A powdery, high molecular weight polyoxymethylene diacetate (number average molecular weight of about 50,000) containing about 0.5% by weight of a polyamide as a thermal stabilizer and 0.1% by weight of 4,4'-butylidene bis(3-methyl-6-tertiary-butyl phenol) as an antioxidant was mixed by dry blending with crystals of the photostabilizer candidates indicated in Table I. The blend was then extruded in 1½ inch diameter extruder manufactured by National Rubber Manufacturing Company using a temperature at the entrance of the barrel of approximately 215° C. which gradually decreased to the discharge end of the barrel to 190° C. A ⅜ inch valve die was attached to the extruder and heated to a temperature of 190° C. The die was adjusted so that a melt pressure of about 500 p.s.i. was obtained at a screw speed of 40 r.p.m. The extrudate temperature was about 180° C. A rod ⅛ inch in diameter was obtained which was subsequently quenched and cut into small pieces in a standard slicing or bead-cutting machine. A major portion of the molding powder thus produced was injection molded in a standard machine into samples ⅛ in thickness, 1½ inches wide, and 2 inches long for exposure in the X–W Weather-Ometer. Some of the molding powder from each sample was compression molded into thin films for measurement of the absorption spectrum of the particular ultraviolet light absorber. These films were produced by compression molding the powder into a film 1 mm. in thickness at 180–200° C. for ½ minute at 20,000 p.s.i. followed by quenching in cold water under the same pressure. A Cary Recording Spectrophotometer, Model 14 M, Serial 81, manufactured by the Applied Physics Corp., having a diffuse reflection attachment was used to determine the absorption peaks. The machine was balanced between 250 and 400 millimicrons and the film introduced and spectrum measured from 250 to 400 millimicrons. The peaks were noted and are reported in Table I. Table I shows the amount and type of stabilizer employed in the named composition along with the stability as measured by the Gas Index (GI). The hours of exposure in the Weather-Ometer before noticeable hazing or cracking of the surface of the samples was noted. The first number in the column of exposure time is the time of the last visual observation of the sample which showed no hazing and/or cracking and the latter number in the column of exposure time is the time when the sample showed definite hazing and/or cracking of the surface. An additional column shows the measurements obtained by the ultraviolet scan, indicating that all of the compounds tested show a satisfactory peak for absorbance of harmful light.

From the above table it is apparent that, although other known stabilizers, such as the salicylates and benzophenones, produce a photostability comparable to that of the nitriles of the present invention, the thermal stability of the resin containing the nitriles of the instant invention, as measured by the GI, is markedly superior to resins containing previously known stabilizers. In addition, the measurements of absorption indicate that the nitriles of the present invention absorb in the region of the spectrum necessary for photostabilization.

EXAMPLE 2

In order to further illustrate the operability of the nitriles of the present invention the following samples containing pigments were prepared from the same initial polymer as set forth in Example 1 with representative stabilizers. The indicated amounts of pigments were added to the sample prior to the blending operation and the extrusion operation as set forth above. In this example all of the polymer extruded was injection molded into samples of the same size as set forth in Example 1 and were exposed in the X–W Weather-Ometer according to the method previously described. The surface of the sample was inspected periodically for hazing and/or cracking. The thermal stability (GI) of the resin is reported in Table II. The first number in the column of exposure time in Table II is the time of the last visual observation of the sample which showed no hazing and/or cracking and the latter number in the column of exposure time is the time when the sample showed definite hazing and/or cracking of the surface.

*Table I*

| Amount of Stabilizer | Photostability (Hrs. of Exposure in Weather-Ometer) | | Thermal Stability (GI) | Ultraviolet Absorption Peaks (Millimicrons) |
|---|---|---|---|---|
| | Last Observation Before Change | First Observation After Visible Change | | |
| 1. None (control sample) | 74 | 98 | 4.0 | (a) |
| 2. 1% alpha-carbethoxy beta-phenyl cinnamonitrile | 311 | 351 | 3.8 | 303 |
| 3. 2% of the stabilizer of sample 2 | 426 | (b) | 5.4 | 303 |
| 4. 1% beta(parachlorophenyl) alpha-carbethoxy cinnamonitrile | 201 | 219 | 5.0 | 306 |
| 5. 1% p-methoxy [beta-(p-methoxy phenyl)], alpha-carbethoxy cinnamonitrile | 80 | 138 | 4.1 | 335 |
| 6. 1% beta-phenyl, alpha-cyano cinnamonitrile | 185 | 207 | 3.3 | 320 |
| 7. 1% 2,2'-dihydroxy, 4,4'-dimethoxy benzophenone | 409 | (b) | 16.2 | 290, 350 |
| 8. 1% phenyl salicylate | 225 | 263 | 140.0 | (b) |
| 9. 1% 2,4-dihydroxy benzophenone | 404 | 458 | 219.0 | 288, 325 | a Essentially no absorption in the range of 280 to 400 mm.
b Not determined.

*Table II*

| Amount of Pigment or Stabilizer | Photostability (Hrs. of Exposure in Weather-Ometer) | | Thermal Stability (GI) |
|---|---|---|---|
| | Last Observation Before Change | First Observation After Visible Change | |
| 1. None (Control Sample) | 62 | 118 | 7.1 |
| 2. 1% by weight of titanium dioxide | 159 | 194 | 10.0 |
| 3. 2% by weight of alpha-carbethoxy beta-phenyl cinnamonitrile and ½% by weight of titanium dioxide | 394 | (a) | 8.8 |
| 4. ½% by weight of titanium dioxide and 1% of 2-hydroxy-4-methoxy 4'-chlorobenzophenone | 400 | (a) | 18.8 |
| 5. 0.91% by weight of ferro cadmium selenide and 0.09% by weight of cadmium sulfide (no photostabilizer) | 114 | 137 | 15.0 |
| 6. Same as 5 above with the addition of 2% of alpha-carbethoxy beta-phenyl cinnamonitrile | 333 | 375 | 17.6 |
| 7. Same as 5 above with the addition of 1% 2-hydroxy-4-methoxy 4'-chlorobenzophenone | 400 | (a) | 40.3 | a Not determined.

It can be seen from Table II that the nitriles of the present invention impart excellent photostability to pigmented compositions without affecting the thermal stability of the base resin as opposed to certain types of benzophenones which adversely affect the thermal stability of the base resin. In some cases, as in sample 3 above, the stability of the pigmented resin is actually improved by the addition of the photostabilizer of the present invention.

The polymer employed in this invention is a polyoxymethylene having a number average molecular weight of at least 15,000. There are several varieties of polyoxymethylene which are distinguishable by the groups which terminate the polymer chain of recurring (—CH$_2$—O) units. For example, there are polyoxymethylene glycols in which the terminating groups are hydroxyls; polyoxymethylene dicarboxylates in which the terminating groups are esters, such as acetate and propionate; and polyoxymethylene diethers in which the terminating groups are alkyl or aryl groups joined to a polymer chain by an ether oxygen. The principle differences between any two of these types of polyoxymethylenes is in thermal stability and hydrolytic stability, polyoxymethylene diether being more stable to hydrolysis and about the same or better in thermal stability than polyoxymethylene dicarboxylate, while the latter is better in both respects than polyoxymethylene glycol. Each of these varieties of polyoxymethylenes is susceptible to photodegradation, and, therefore, each of them is intended to be included within the slope of this invention under the generic term "polyoxymethylene."

Polyoxymethylenes are made by polymerizing formaldehyde in the presence of any group of polymerization initiators, e.g., aliphatic amines; tertiary amino-nitrogen polymers, trihydrocarbon phosphines, arsines, or stibines; organometallic compounds, metal carbonyls, quaternary ammonium or phosphonium salts, and tertiary sulfonium salts. These processes are described and claimed in U.S. Patent 2,734,889, issued on February 14, 1956, to F. C. Starr, Jr.; U.S. Patent 2,768,994, issued on October 30, 1956, to R. N. MacDonald; U.S. Patent 2,828,286, issued on March 25, 1958, to R. N. MacDonald; U.S. Patent 2,844,561, issued July 22, 1958, to M. F. Bechtold et al.; U.S. Patent 2,848,437, issued on August 19, 1958, to W. P. Langsdorf et al.; U.S. Patent 2,841,570, issued July 1, 1958, to R. N. MacDonald; and in copending patent application U.S. S.N. 785,135, filed January 6, 1959, by H. H. Goodman, et al.

Polyoxymethylene dicarboxylates may be prepared by the processes described and claimed in copending applications U.S. S.N. 681,188, filed August 30, 1957, now U.S. Patent No. 2,998,409, by S. Dal Nogare et al., and U.S. S.N. 763,842, filed September 29, 1958, now U.S. Patent No. 2,964,500, by S. H. Jenkins et al. Polyoxymethylene diethers may be prepared by the processes described and claimed in copending applications U.S. S.N. 682,325, filed by N. Brown et al., September 6, 1957, and U.S. S.N. 785,136, filed by N. Brown et al. on January 6, 1959.

The photostabilizers which may be used in this invention are the cinnamonitriles having the general formula:

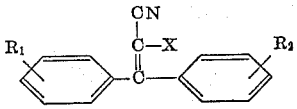

wherein R$_1$ and R$_2$ are groups selected from the class consisting of hydrogen, alkyl groups of 1–4 carbon atoms, alkoxy groups of 1–12 carbon atoms, cyclohexyl, and chlorine and X is a group selected from the class consisting of cyano, carboalkoxy groups of 1–4 carbon atoms, carboxamide, carboxamides substituted with at least one alkyl group of 1–4 carbon atoms and carboxamides substituted with a phenyl group. Illustrative of these class compounds are the following: alpha-carbomethoxy, beta-phenyl cinnamonitrile; alpha carbethoxy, beta-phenyl cinnamonitrile; alpha-carbobutoxy, beta-phenyl cinnamonitrile; alpha-carbopropoxy beta-phenyl cinnamonitrile; alpha-carboxylic acid, mono, di, or tri-ethylene glycol esters; alpha-carboxylic acid glycerol esters; p-chloro [beta(p-chlorophenyl), alpha-carboalkoxy] cinnamonitrile; p-methoxy[beta(p-methoxyphenyl), alpha-carboalkoxy] cinnamonitrile; alpha-carboxamide beta-phenyl cinnamonitrile; alpha-cyano-beta-phenyl cinnamonitrile; m-methyl[beta(m - methylphenyl), alpha - carboalkoxy] cinnamonitrile; p-cyclohexyl[beta(p-cyclohexyl phenyl) alpha-carboalkoxy] cinnamonitrile; alpha-carbomethoxy, beta(p-dodecoxy phenyl) cinnamonitrile; and p-dodecoxy [alpha-carbomethoxy-beta(p-dodecoxy phenyl)]cinnamonitrile. Other combinations of substituent groups falling within the above formula may be determined by those skilled in the science of chemistry. Among the above named nitriles, alpha-carbethoxy beta-phenyl cinnamonitrile is preferred. This compound has been incorporated into polyoxymethylene resin and extruded or injection molded into various kinds of shaped articles, e.g., piping, hardware, such as door knobs, hinges, etc., automobile instrument panels, hose couplings, telephone handset parts, and many other items, all of which showed excellent resistance to photodegradation and superior moldability due to the excellent thermal stability of the resin.

The amount of photostabilizer which may be employed is usually less than 10% by weight of the polyoxymethylene, and is preferred to be employed at the level of from 0.10 to 5% by weight of the resin. Loadings exceeding 10% by weight of the polyoxymethylene base resin are also operable. However, it has been determined that loadings of the photostabilizer above 10% affect the physical properties of the polymer, and in most cases, are economically undesirable. Many nitriles of the above formula impart no color to the base resin which in its unmodified condition is white. In addition to the excellent retention of color, the nitriles have no adverse effect upon the thermal stability of the resin, and in certain cases, actually improve the thermal stability as shown by the above examples.

The preferred method for incorporating the nitriles into the polyoxymethylene includes dry or solution blending of the nitrile with the polyoxymethylene, followed by milling, melting, or extruding the blended mixture. Other methods may be apparent to those skilled in this type of technology.

The product composition of this invention finds its principle utility in molded objects which are to be subjected to any light source. Thus, any object of polyoxymethylene which is to be used outdoors would advantageously contain one of the nitriles described above. Such objects, for example, are film, filamentary structures, such as fibers, filaments, and bristles, pipes, tubes, rods, sheets, bottles, and various other shaped articles.

I claim:
1. A composition of improved stability comprising a polyoxymethylene having a number average molecular weight of at least 15,000 and 0.01 to 10% by weight of said polyoxymethylene of a photostabilizer having the formula:

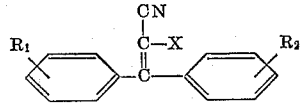

wherein R$_1$ and R$_2$ are groups selected from the class consisting of hydrogen, alkyl groups of 1–4 carbon atoms, alkoxy groups of 1–12 carbon atoms, cyclohexyl, and chlorine and X is a group selected from the class consisting of cyano, carboalkoxy groups of 1–4 carbon atoms, carboxamide, carboxamides substituted with at least one alkyl group of 1–4 carbon atoms and carboxamides substituted with a phenyl group.

2. A composition of improved photostability comprising a polyoxymethylene having a number average molecular weight of at least 15,000 and 0.1 to 5% by weight of said polyoxymethylene of a photostabilizer having the formula:

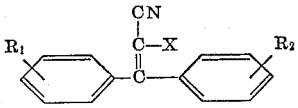

wherein R$_1$ and R$_2$ are groups selected from the class consisting of hydrogen, alkyl groups of 1–4 carbon atoms, alkoxy groups of 1–12 carbon atoms, cyclohexyl, and chlorine and X is a group selected from the class consisting of cyano, carboalkoxy groups of 1–4 carbon atoms, carboxamide, carboxamides substituted with at least one alkyl group of 1–4 carbon atoms and carboxamides substituted with a phenyl group.

3. A composition of improved photostability comprising a polyoxymethylene having a number average molecular weight of at least 15,000 and 0.1 to 5.0% by weight of alpha-carbethoxy beta-phenyl cinnamonitrile.

4. A film comprising a composition of claim 1.

5. A filamentary structure comprising the composition of claim 1.

6. A shaped article comprising the composition of claim 1.

No references cited.